United States Patent [19]
Dubugnon

[11] Patent Number: 5,806,362
[45] Date of Patent: Sep. 15, 1998

[54] METHOD AND APPARATUS FOR CARRYING OUT AN OPERATION ON A MECHANICAL WORKPIECE

[76] Inventor: Olivier Dubugnon, Vullierens CH-1115, Switzerland

[21] Appl. No.: 750,273

[22] PCT Filed: Apr. 3, 1996

[86] PCT No.: PCT/EP96/01479

§ 371 Date: Dec. 3, 1996

§ 102(e) Date: Dec. 3, 1996

[87] PCT Pub. No.: WO96/31319

PCT Pub. Date: Oct. 10, 1996

[30] Foreign Application Priority Data

Apr. 3, 1995 [SE] Sweden ................................. 9501251

[51] Int. Cl.⁶ ................................. B21J 9/18; B21J 15/20
[52] U.S. Cl. ..................... 72/453.04; 72/444; 72/453.03; 72/452.8
[58] Field of Search ........................ 72/442, 444, 453.02, 72/453.03, 452.8, 452.9, 114, 453.15, 453.16, 455, 452.6

[56] References Cited

U.S. PATENT DOCUMENTS 5,316,277  5/1994  Banks .
5,425,262  6/1995  Dubugnon .

FOREIGN PATENT DOCUMENTS 424190    4/1991   European Pat. Off. .
9218264  10/1992   WIPO .

*Primary Examiner*—David Jones
*Attorney, Agent, or Firm*—Mark P. Stone

[57] ABSTRACT

Apparatus for carrying out an operation on a mechanical workpiece which operation comprises at least one stroke, or relative movement, along a predetermined path, of at least two tool members (4,5) each being arranged on a tool carrying member (1,2). The mechanical workpiece is positioned between the tool members (4,5) and the tool carrying members (1,2) are approached to each other in a first part of said at least one stroke. At least one force transferring element is arranged to be inserted by means of a low force during said first part of said stroke into a position between at least one tool carrying member and an activation element for transferring a high force during a second part of said stroke between said activation element and said at least one tool carrying member.

8 Claims, 7 Drawing Sheets

METHOD AND APPARATUS FOR CARRYING OUT AN OPERATION ON A MECHANICAL WORKPIECE

TECHNICAL FIELD

This invention relates to apparatuses for carrying out operations on a mechanical workpiece e.g. tools or machines for pressing, riveting, clinching, cutting, welding, spot-welding etc. The tools and machines could be of stationary or hand-held type. The power source could be of any type, hydraulic, pneumatic, electric, of manual type etc.

BACKGROUND ART

One type of tool belonging to the category defined above is previously known from the International patent application WO92/18264. This published application is herewith incorporated by reference.

The machine according to the above makes one or several "strokes" towards the workpiece in order to achieve the expected effect. At the end of the active stroke very high forces are typically applied. The opening between the active machine elements, for introducing the workpieces can be decreased in a first part of the stroke before the second active part takes place.

DISCLOSURE OF THE INVENTION

One object of the present invention is to provide a method and a machine for pressing, riveting, clinching, cutting, welding, spot-welding etc. which is fast and efficient and possible to use on work-pieces with different geometries and large dimensions.

Another object of the invention is to provide a tool which meets the requirements according to the above still being so light and compact that it could be used as a versatile hand-held tool.

Another object of the invention is to provide a machine with a very high safety level. It is practically impossible to injure e.g. a hand or finger of the operator or a collaborator during the operation.

The inventive idea takes into consideration the fact that when making one of the above mentioned operations, pressing, clinching, riveting, inserting, cutting, welding etc. the total active force is only needed for a short part of the stroke of the tool. The rest of the stroke is needed for approaching the parts of the tool to the point of operation.

The present invention, which provides a solution to the said technical problems, is characterised according to the appended claims.

BRIEF DESCRIPTION OF THE FIGURES

Other objects, uses and advantages of this invention will be apparent from the reading of this description which proceeds with reference to the accompanying drawings forming part thereof and wherein.

DETAILED DESCRIPTION OF THE INVENTION

Figure 1:
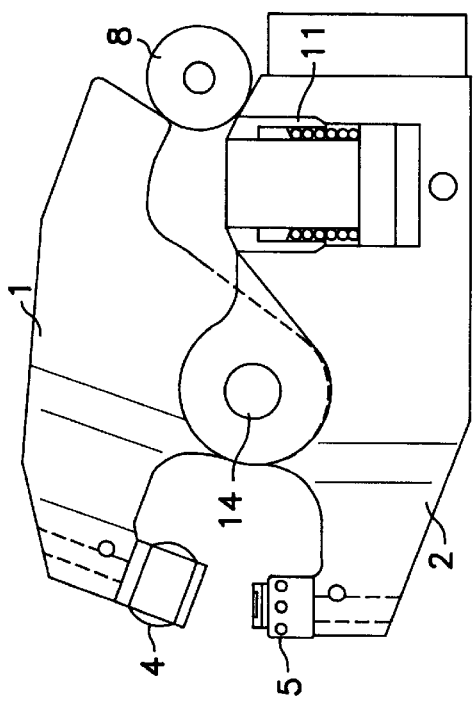
FIGS. 1 to 4 show different phases of the operation of an embodiment of the machine according to the present invention, implemented as a hand-held tool.
Figure 2:
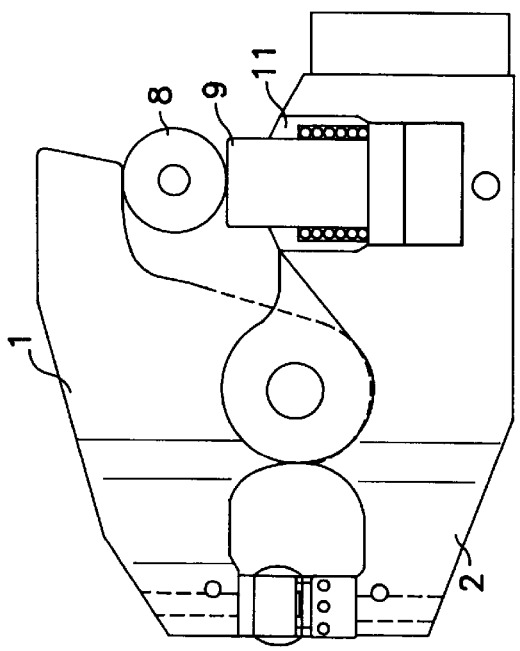

FIGS. 1–4 show schematically an apparatus according to the present invention implemented as a hand-held tool. FIG. 1 shows the starting position by which the mechanical workpieces, not shown, are positioned between the two tool carrying members 1 and 2. FIG. 2 shows the approaching stroke for the two tool carrying members achieved by means of pushing a roller 8, in this case by handforce, into position between the tool carrying member 1 and the active element 11, in the form of a cylinder-piston assembly. The device which is pushed in between the tool carrying member and the active element can have other forms than a cylindrical roller. It can e.g. have the form of a sphere or a cam with only part of the external surface being spherical or cylindrical. As will be described below this device can also integrate the active element. During this phase the active element 9,11 is not activated. As a matter of fact the element 11 can not be activated until the roller 8 has reached its final position in which it constitutes a force transferring element between the active element 11 and the end portion of the tool carrying member 1. Said final position is detected by means of a detector 12. In this case the detector is an electrical micro-switch connected as enabling element in the control circuitry of the machine.

Figure 3:
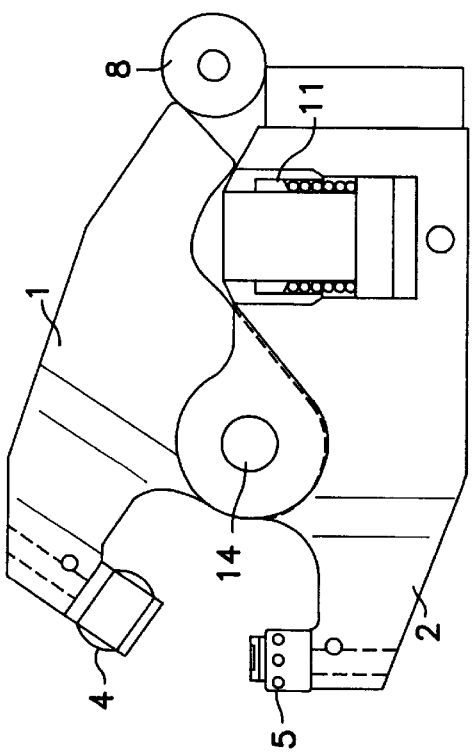

In FIG. 3 the machine is now in position to make the actual work stroke. The distance between the tool members 4 and 5 is now very short and in addition to the workpieces, not shown, it would be almost impossible to enter, by mistake, e.g. a finger or similar between these members.

Figure 4:
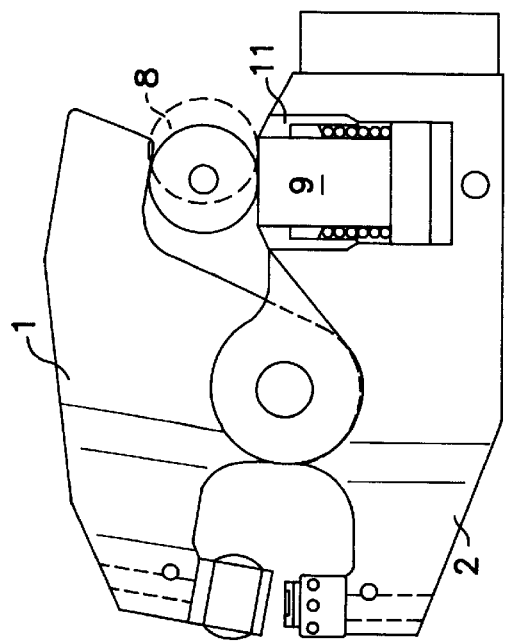
Figure 5:
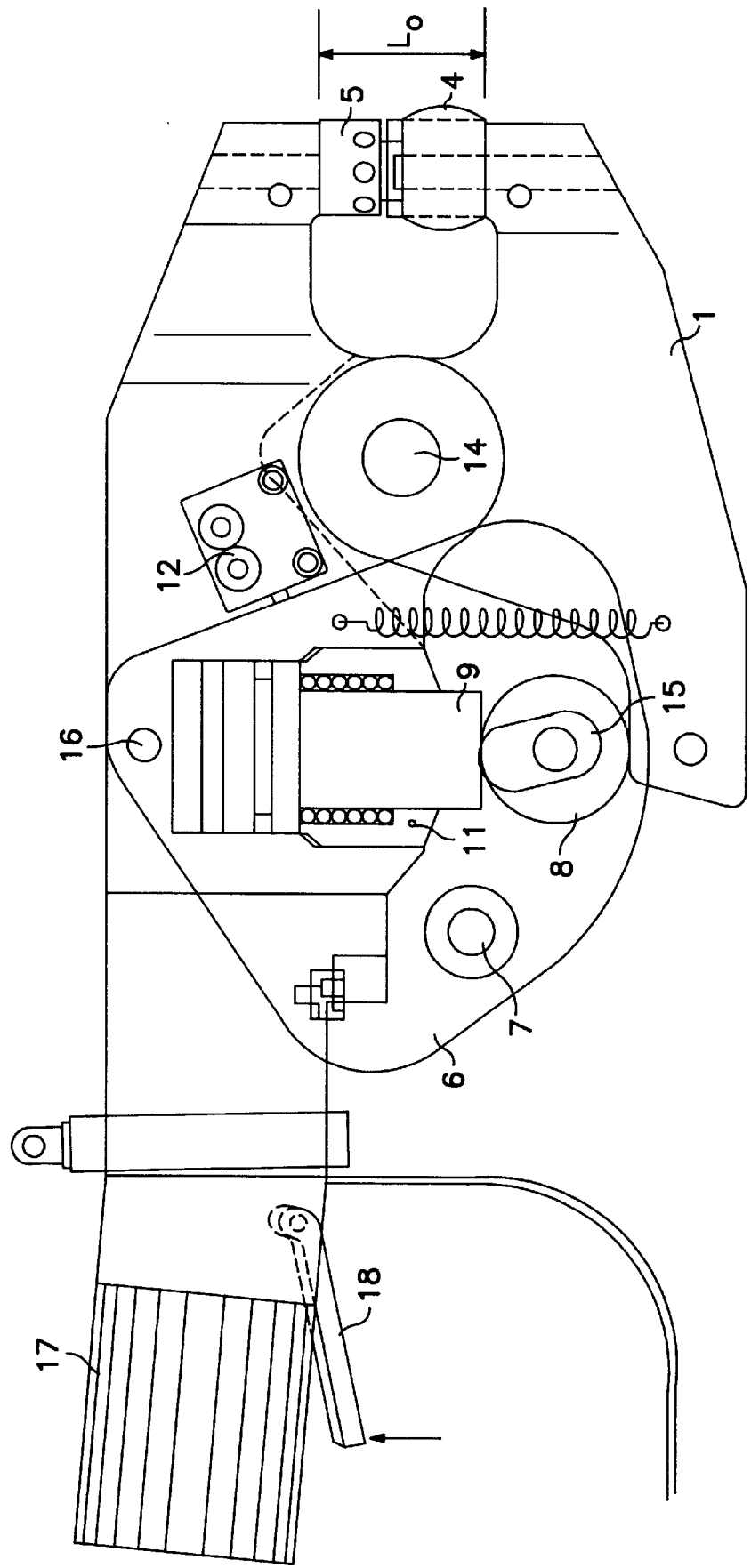
FIG. 5 shows more in detail the same machines in the FIGS. 1–4.

When the piston of the active member 9,11 is actuated as shown in FIG. 4, the force transferring element, in this case a cylindrical roller 8 transfers the force, which is now considerable, to the rear part of the tool carrying member 1 making it pivot around the pivoting joint 14. The force transferring element can also be spherical or be provided with spherical or cylindrical portions on its external surface. During this pivotal motion the linear motion of the piston is interacting with the rotating motion of the tool carrying member 1 and the difference in path which is relatively small is compensated by a smaller rolling movement of the element 8. In this particular embodiment the element 8 has an axis which can move in an elongated hole 15 arranged in two guiding plates 6. On one of these guiding plates a handle 7 is mounted perpendicular to the plane of the paper. The two guiding plates 6 are mounted on each side of the tool carrying members and are pivoting around a pivoting point 16. It is by moving the handle downwards the force transferring element 8 is entered between the piston 9 and the rear portion of the tool carrying member 1.

The principles of the invention are of course applicable to stationary equipment as well, with single or double or multiple stroke machines.

As understood from the above the tool-body has two main parts or tool-carrying members, 1 and 2 each provided with a handle 17 and 7 respectively in the embodiment according to the FIGS. 1–4. Each member 1 and 2 carries a tool member 4, 5. The tool members are not separately activated as in the machine according to WO92/18264, to decrease the gap between them. The tool members could, however, be "activated" for instance in applications for spot-welding, for ultrasonic treatment, for feeding of rivets etc. Sometimes an active stripper 3 could also be needed.

The tool function is achieved by means of e.g. the pressure between the tool members and the workpiece positioned between the parts 4, 5. The handles are, in the shown example, arranged with their axes perpendicular to each other. The two parts 1 and 2 of the tool-body are articulated in relation to each other by means of a bearing 14. The tool members, e.g. a punch and a die have been represented schematically with the units 4 and 5 in the FIGS. 1–4.

The machine is of course connected to a power and control system of some common type, not shown, and the main trigger 18 could be arranged on the handle 17.

It should be noted that no locking between the tool carrying members 1 and 2 is taking place. The pivotal movement of the parts 1 and 2 could continue in the prolongation of the first positioning movement.

The part 1 is possible to design mechanically balanced around the bearing 14, if desired. This means that the force needed to carry out this approaching movement will be very low and the movement can be very fast irrespective of the orientation of the tool even when the movement is manual as in this example. The approaching movement can be assisted by means of an actuator in the form of a separate pneumatic or hydraulic cylinder-piston assembly. This kind of arrangement could of course be used on manual as well as stationary machines.

Thus, according to the inventive idea the complete stroke or movement between the tool parts 4 and 5 during one operation of the tool for pressing, riveting, clinching etc. has been divided into two parts. A first part which is an approaching stroke or movement and a second part which is an active stroke or movement. Therefore, the power-part of the drive system, hydraulic, pneumatic, electric etc. can be designed taking into account the requirements of the active stroke or movement only. The other part of the complete stroke which with a good design of the tool typically requires less than 1/1000 of the force of the active stroke can be carried out manually, as described above, or assisted by means of an actuator.

The approaching part of the movement is in this example defining a plane which will also include the trajectory for the second part of the stroke. The inventive idea, however, also comprises embodiments in which this is not the case. The first and second parts of the movement could e.g. define trajectories for the active parts 4, 5 in planes perpendicular to each other or with other angular relations.

In the tool position illustrated in FIG. 3, i.e. when the tool parts 4 and 5 have the correct positions for the second part of the stroke, the parts 1 and 2 of the tool has moved to form a very small gap between the tool parts.

Figure 6:
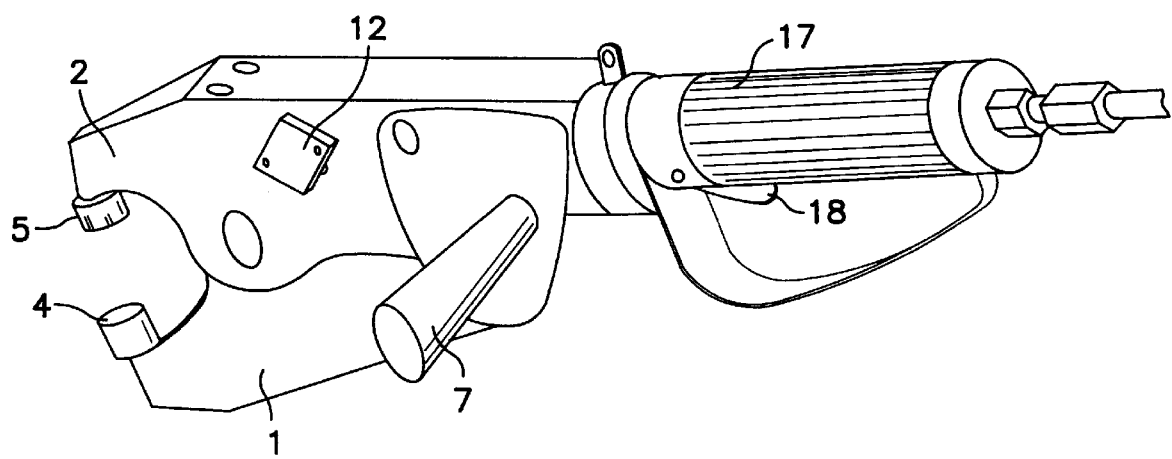
FIG. 6 shows a perspective view of a hand held machine according to the invention.
Figure 7:
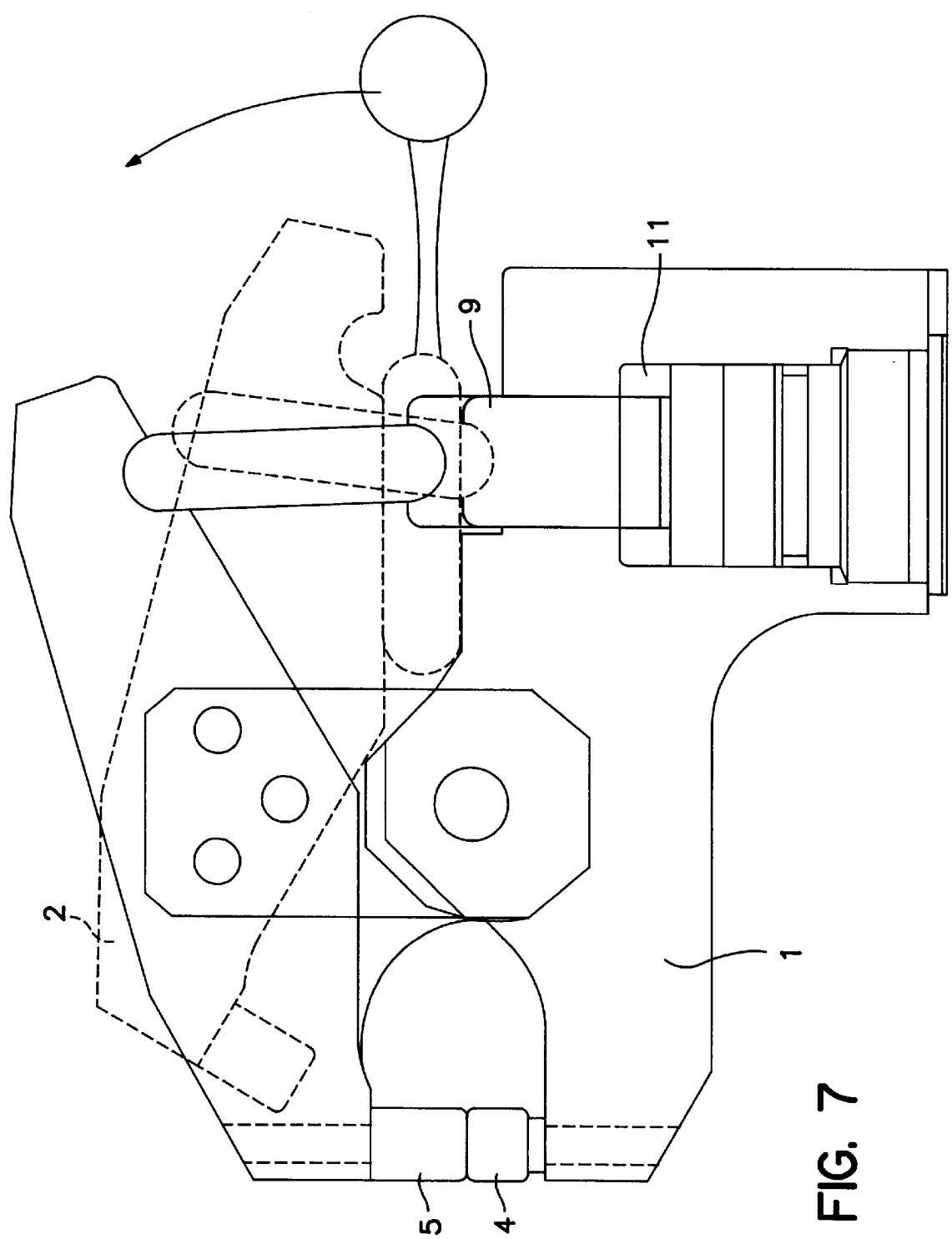
FIG. 7 shows a machine with one activation element and a force transferring element of another type.

FIG. 6 shows a handheld machine according to the invention. FIG. 7 shows another embodiment of the invention. This machine also has two tool carrying members and two tool-members shown in schematical form. In this case there is also only one active element 9. With the dotted line the pivoting member is shown in open position. A lever which could be operated manually is shown in the horizontal position connected to a force transferring element positioned horizontally on top of the piston of the activation element 9. In order to make a quick approach of the upper tool carrying member towards the lower tool carrying member the lever is raised to an upright position whereby the force transferring element is pushing the rear end of the upper tool carrying member and rotates the same to the starting position for the second part of the stroke. In the next phase the cylinder-piston assembly 9, 11 is activated.

Figure 8:
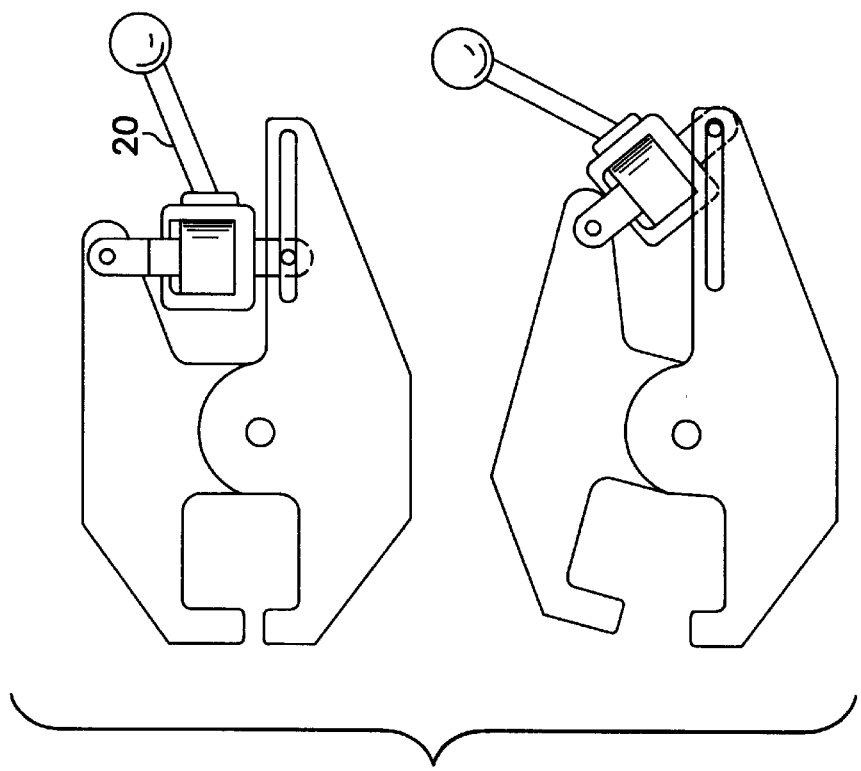
FIG. 8 shows another embodiment of the machine according to the invention.

FIG. 8 shows another embodiment of the machine according to the invention. The first part of the stroke, the approaching stroke, is achieved by means of a manual movement of the lever 20. In the upper figure the machine is in position for the second part of the stroke. It is understood that the second part of the stroke should not be possible to start before the activation element has reached its final position. In this case the force transferring element is integrated with the activation element.

Figure 9:
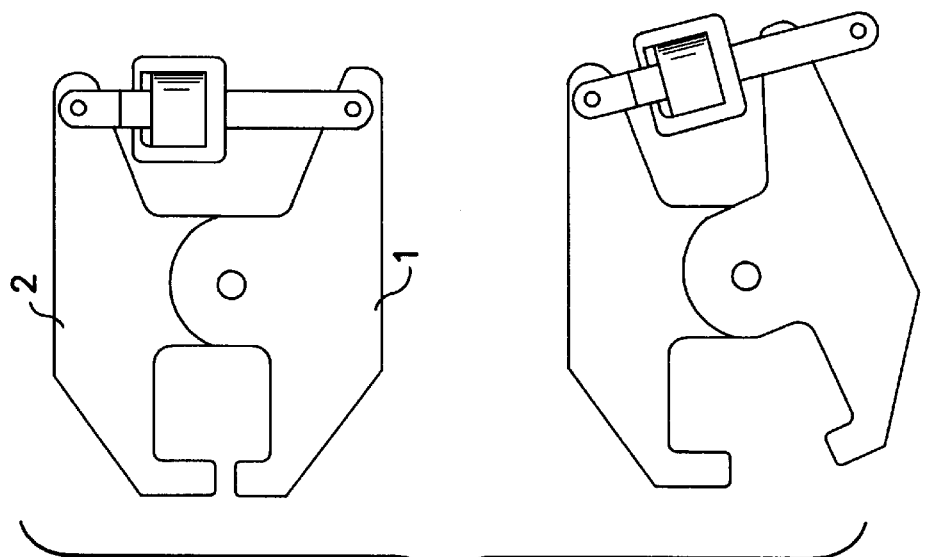
FIG. 9 shows another embodiment of the machine according to the invention.

In the embodiment according to FIG. 9 the activation element could be disconnected from one of the tool carrying members to make possible the full opening of the parts 1, 2. The force transferring element is integrated here too with the activation element.

Figure 10:
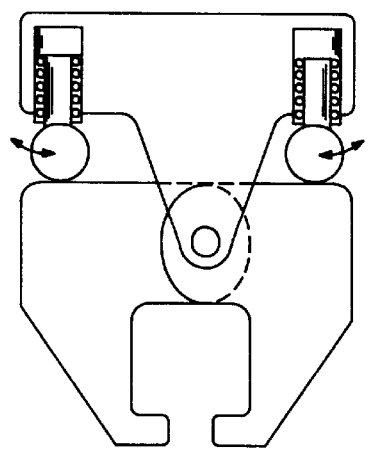
FIG. 10 shows an embodiment having two activation elements and two force transferring elements.

FIG. 10 shows an embodiment having two activation elements and two force transferring elements.

Figure 11:
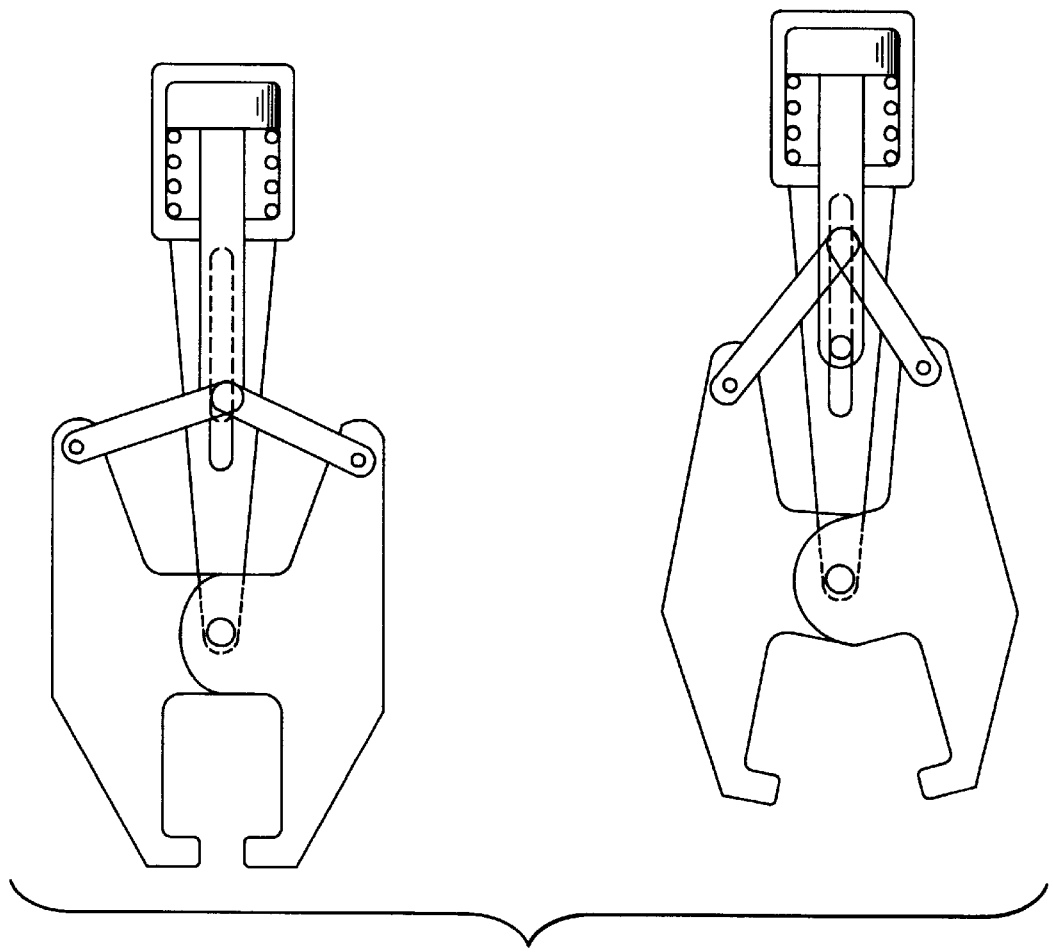
FIG. 11 shows an embodiment in which two rods forming a knee are used as force transferring elements.

In FIG. 11 two rods forming a knee are used as force transferring elements. When these rods are pushed to the left in the lower figure the tool carrying members will approach each other. At the end of that first part of the stroke the knee joint is connected to the piston of the activation element. The rods can then transfer the higher force to the tool carrying members.

Figure 12:
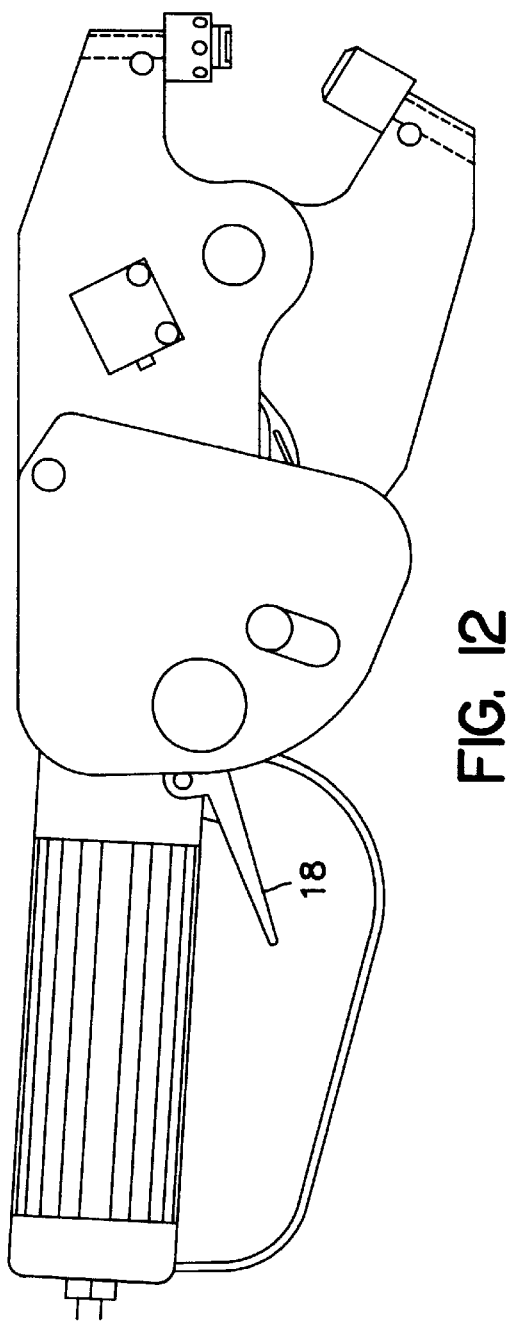
FIGS. 12 and 13 show a side view of the tool according to FIG. 6 in open and closed positions.
Figure 13:
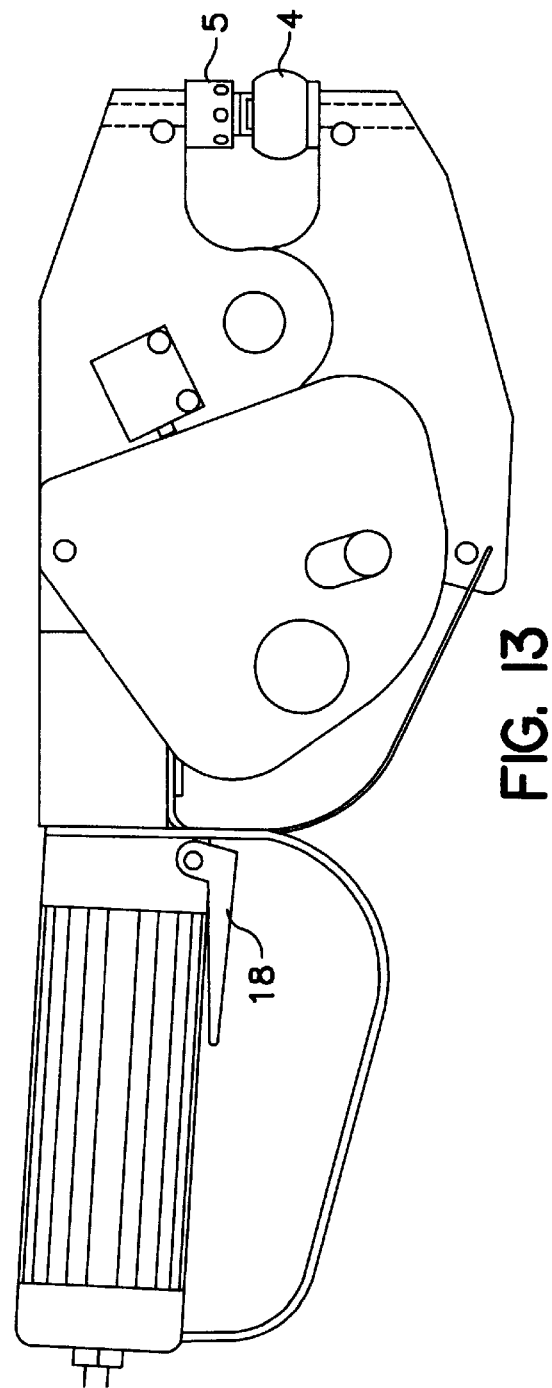

The FIGS. 12 and 13 show a side view of the tool according to FIG. 6 in an open (FIG. 12) and a closed position (FIG. 13). In FIG. 13 the main trigger 18 has been activated and the last part of the stroke has been carried out. The workpieces positioned between the tool parts 4 and 5 are not shown.

Figure 14:
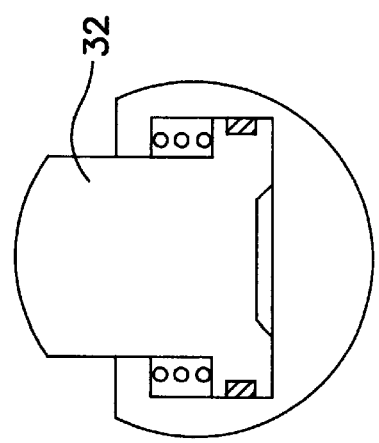
FIG. 14 shows an integrated activation and force transferring element.

In FIG. 14 an integrated activation and force transferring element is shown. Preferably at least the portions of the external surface which will come into contact with the tool carrying parts have cylindrical or spherical form. Thus, by means of inserting this element between the tool carrying parts during the first phase of the operation the approaching part of the stroke is achieved. The expansion of the same element will then provide the power part of the stroke. Flexible hydraulic connectors (not shown) are in this case connected to the element.

In the embodiments described above the first part of the stroke is hand powered. This means that the forces involved in the first part of the stroke are relatively low. On one hand this is sufficient on the other hand the low force is of value from the safety point of view. The maximum force is limited. The drive system for the first part could, however, be of any type, e.g electrical, pneumatic, hydraulic etc. The essential thing is that this drive system is separated from the drive system for the working part of the stroke which uses much higher forces.

Thus with a tool design according to the above a fast and safe approach movement of the tool will be achieved which drastically reduces the time per operation and makes it possible to use cost effective power supplies, the tool parts 4, 5 for pressing, punching, cutting, welding etc. could be made with standard components.

I claim:

1. An apparatus for performing an operation on a workpiece, said apparatus comprising at least two tool members (4, 5) each being arranged on a pivotal tool carrying member (1, 2) for providing relative movement of said at least two tool members in a stroke along a predetermined path in which said workpiece is positioned between said at least two tool members; said tool carrying members being movable relative to each other during a first portion of said stroke in which a first predetermined force is applied to said tool carrying members to position said tool members on opposed sides of said workpiece, and during a second portion of said stroke in which a second predetermined force greater than said first predetermined force is applied to said tool carrying members to enable said tool members to perform said operation on said workpiece; an activation element (9, 11) for transferring said second predetermined force to at least one of said tool carrying members during said second portion of said stroke; and at least one force transferring element (8) insertable between at least one of said tool carrying members and said activation element for cooperating with said at least one tool carrying member for causing said relative movement of said at least two tool members during said first portion of said stroke, said force transferring element transferring said second predetermined force from said activation element to at least one of said tool carrying members for causing movement of said at least one tool carrying member during said second portion of said stroke.

2. Apparatus according to claim 1 wherein said force transferring element (a) has a cylindrical external contact surface.

3. Apparatus according to claim 2 wherein said force transferring element (8) is formed in the shape of a cam with a cylindrical external contact surface having a non-constant bending radius.

4. Apparatus according to claim 1 wherein said force transferring element (8) has a spherical external contact surface.

5. Apparatus according to claim 1 wherein said activation element (9, 11) comprises an hydraulic cylinder-piston assembly arranged in one of the tool carrying members (1, 2).

6. Apparatus according to claim 5 wherein the contact surfaces on the activation element (9, 11), the force transferring element (8), and said at least one tool carrying member (1, 2) are arranged so that no sliding movement occurs therebetween during the second portion of said stroke.

7. An apparatus for performing an operation on a workpiece, said apparatus comprising at least two tool members (4, 5) each being arranged on a pivotal tool carrying member (1, 2) for providing relative movement of said at least two tool members in a stroke along a predetermined path in which said workpiece is positioned between said at least two tool members; said tool carrying members being movable relative to each other during a first portion of said stroke in which a first predetermined force is applied to said tool carrying members to position said tool members on opposed sides of said workpiece, and during a second portion of said stroke in which a second predetermined force greater than said first predetermined force is applied to said tool carrying members to enable said tool members to perform said operation on said workpiece; at least one force transferring and expansion element (32) insertable between at least one of said tool carrying members (1, 2) and a support surface for cooperating with said at least one tool carrying member for causing said relative movement between said at least two tool members during said first portion of said stroke, said force transferring and expansion element (32) transferring said second predetermined force between said support surface and said at least one tool carrying member during said second portion of said stroke.

8. The apparatus as claimed in claim 7 wherein said force transferring and expansion element is integrally formed as a single component.

* * * * *

UNITED STATES PATENT AND TRADEMARK OFFICE
CERTIFICATE OF CORRECTION

PATENT NO. : 5,806,362
DATED : Sept. 15, 1998
INVENTOR(S) : Olivier Dubugnon

It is certified that error appears in the above-identified patent and that said Letters Patent is hereby corrected as shown below:

Claim 2, Line 2 [Column 5, Line 28]: Delete "(a)", and substitute - -(8)- -.

Signed and Sealed this

Third Day of April, 2001

Attest:

NICHOLAS P. GODICI

Attesting Officer    Acting Director of the United States Patent and Trademark Office